(12) United States Patent
Ishibashi et al.

(10) Patent No.: US 7,628,145 B2
(45) Date of Patent: Dec. 8, 2009

(54) CONTROL METHOD OF COMPRESSION SELF IGNITION INTERNAL COMBUSTION ENGINE

(75) Inventors: Yoichi Ishibashi, Wako (JP); Hideaki Morikawa, Wako (JP); Shunsuke Kitawaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 11/769,557

(22) Filed: Jun. 27, 2007

(65) Prior Publication Data
US 2008/0000462 A1  Jan. 3, 2008

(30) Foreign Application Priority Data
Jun. 30, 2006  (JP)  .............................. 2006-181142

(51) Int. Cl.
*F02B 47/08*  (2006.01)
*F02M 25/07*  (2006.01)

(52) U.S. Cl. .......................... 123/568.11; 123/568.14; 123/568.31

(58) Field of Classification Search ............ 123/568.11, 123/568.14, 568.21, 568.22, 568.31
See application file for complete search history.

(56) References Cited

U.S. PATENT DOCUMENTS

| | | | |
|---|---|---|---|
| 6,634,345 B2 * | 10/2003 | Yoshizaki et al. | 123/568.12 |
| 7,234,438 B2 * | 6/2007 | Yang | 123/295 |
| 2001/0054416 A1 * | 12/2001 | Yoshizaki et al. | 123/568.12 |
| 2004/0118116 A1 * | 6/2004 | Beck et al. | 60/601 |
| 2005/0126537 A1 * | 6/2005 | Daniels et al. | 123/406.14 |

* cited by examiner

*Primary Examiner*—John T Kwon
(74) *Attorney, Agent, or Firm*—Westerman, Hattori, Daniels & Adrian, LLP

(57) ABSTRACT

An engine 1 provided with a fuel injection mechanism (a fuel injection system 18 and an FI control unit 41) that supplies fuel of arbitrary quantity into a combustion chamber 9 and a variable valve mechanism (an intake valve 14, an exhaust valve 15, hydraulic electromagnetic valve drive units 16, 17 and a valve event control unit 40) that varies the ratio of burned gas and air-fuel mixture in the combustion chamber 9 for combusting fuel by compression self ignition, is controlled so that a deviation ΔT between combustion initiation temperature and peak temperature after combustion in the combustion chamber 9 is converged in a predetermined range.

3 Claims, 5 Drawing Sheets

CONTROL METHOD OF COMPRESSION SELF IGNITION INTERNAL COMBUSTION ENGINE

BACKGROUND OF THE INVENTION

The present invention relates to a control method of a compression self ignition internal combustion engine.

It is known that when in-cylinder gas temperature, in the vicinity of a compression stroke at top dead center, exceeds 1000 K in a gasoline internal combustion engine that executes compression self ignition, self ignition combustion generally occurs, for example, refer to JP-A No. 2001-323828.

However, in compression self ignition combustion, as a condition of combustion in the preceding cycle provides energy to combustion in the next cycle, the internal combustion engine is required to be controlled so that the temperature in the vicinity of compression top dead center is 1000 K, plural elements are required to be variably controlled, and its algorithm is very intricate. When the internal combustion engine is configured so that each parameter is mapped based upon data experimentally acquired and the internal combustion engine is controlled using these parameters, individual dispersion among internal combustion engines and various conditions are forecast and experiments are required to be made, and enormous time is required for setting parameters.

The invention is made in view of such a problem and the object is to provide a control method of a compression self ignition internal combustion engine that enables stable compression self ignition combustion by converging a deviation between combustion initiation temperature and peak temperature after combustion in a predetermined range.

SUMMARY OF THE INVENTION

To achieve the object, according to the control method of the compression self ignition internal combustion engine according to the invention, the compression self ignition internal combustion engine (for example, an engine 1 in an embodiment) provided with a fuel injection mechanism (for example, a fuel injection system 18 and an FI control unit 41 in the embodiment) that supplies fuel of arbitrary quantity into a combustion chamber and a variable valve mechanism (for example, an intake valve 14, an exhaust valve 15, hydraulic electromagnetic valve drive units 16, 17 and a valve event control unit 40 in the embodiment) that varies the ratio of burned gas and air-fuel mixture in the combustion chamber for combusting fuel by compression self ignition is controlled so that the deviation between combustion initiation temperature and peak temperature after combustion in the combustion chamber is converged in the predetermined range.

It is desirable that in the control method of the compression self ignition internal combustion engine according to the invention described above, an EGR rate is substituted for the deviation.

At this time, it is desirable that the EGR rate is calculated based upon fuel injection quantity, air-fuel ratio, intake air temperature, exhaust gas temperature, in-cylinder pressure and the data of the engine.

When the control method of the compression self ignition internal combustion engine according to the invention is configured as described above, the deviation between combustion initiation temperature and peak temperature after combustion can be substituted for combustion heat in the internal combustion engine and the heat capacity of working media required in the next cycle (air-fuel mixture and residual gas in the combustion chamber while the intake valve is closed), compression self ignition combustion in the next cycle is stably generated by converging the deviation in the predetermined range, and combustion after ignition can be smoothed. Further, as control parameters can be possibly reduced, control algorithm can be simplified.

Besides, based upon new information that "an EGR rate can be substituted for a deviation between combustion initiation temperature and peak temperature after combustion in a combustion chamber in such a compression self ignition internal combustion engine", compression self ignition combustion can be stably generated by controlling the EGR rate. At this time, sensors used in a normal internal combustion engine can be used by enabling the EGR rate to be calculated based upon fuel injection quantity and others, dedicated sensors for control are not required, and a cost when the control method according to the invention is applied to an internal combustion engine can be reduced.

DETAILED DESCRIPTION OF THE INVENTION

Figure 1:
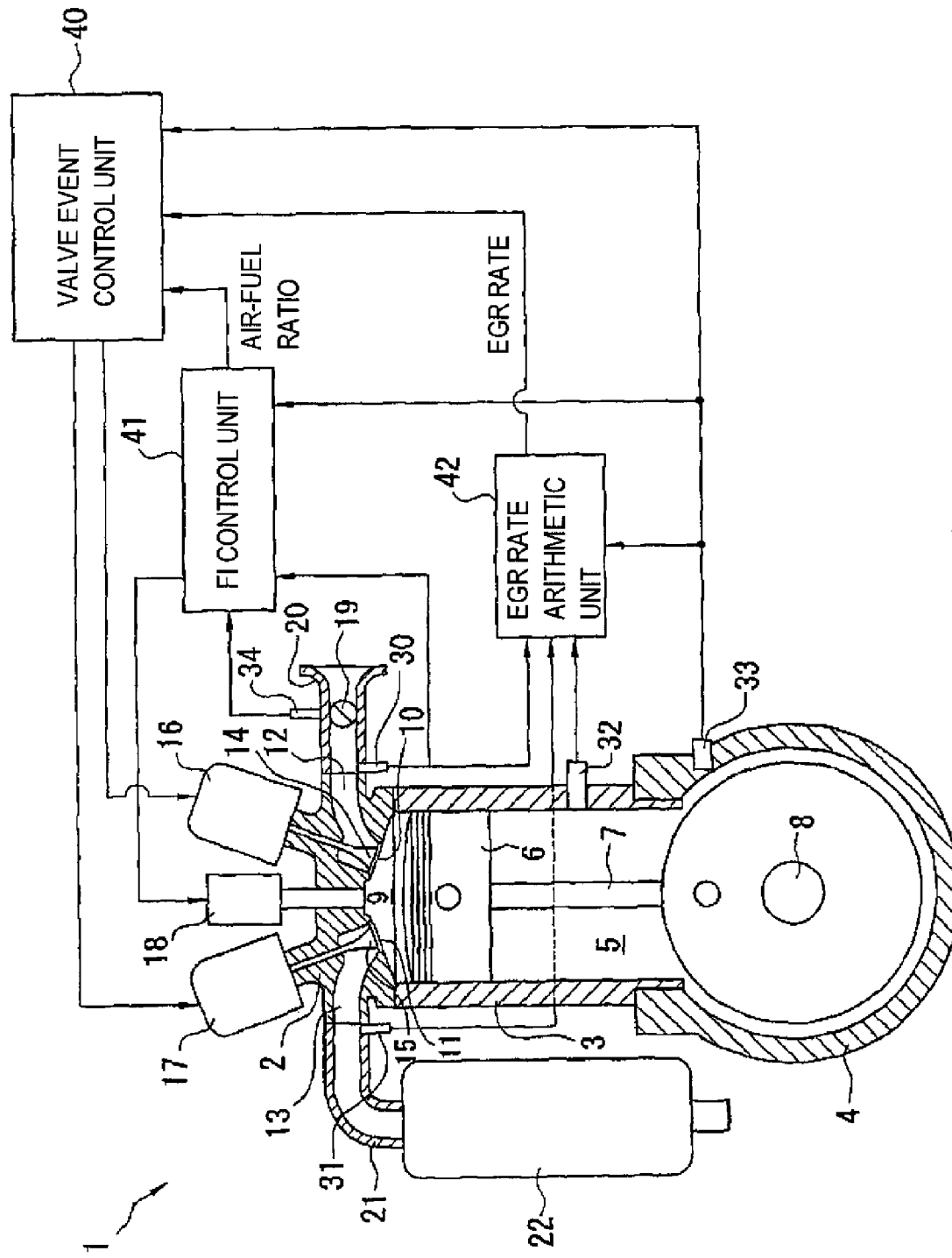
FIG. 1 is a block diagram showing the configuration of an engine according to the invention.

Referring to the drawings, a preferred embodiment of the invention will be described below. First, referring to FIG. 1, the configuration of an engine 1 to which a control method of a compression self ignition internal combustion engine according to the invention is applied will be described. This engine 1 is configured by a cylinder head 2, a cylinder block 3 and a crankcase 4. A cylinder body 5 cylindrically extended is formed inside the cylinder block 3 and further, a piston 6 is slidably arranged in the cylinder body 5. The piston 6 is connected to a crankshaft 8 rotatably held in the crankcase 4 via a connecting rod 7. A combustion chamber 9 is formed with the combustion chamber encircled by the cylinder body 5, the piston 6 and the cylinder head 2, and an intake port 12 and an exhaust port 13 communicate with the combustion chamber 9 via an intake inlet 10 and an exhaust outlet 11 respectively formed in the cylinder head 2. An intake poppet valve 14 and an exhaust poppet valve 15 are biased in directions in which the intake inlet 10 and the exhaust outlet 11 are ordinarily closed.

Hydraulic electromagnetic valve drive units 16, 17 that vertically reciprocate the intake valve 14 and the exhaust valve 15 according to an instruction signal from a valve event control unit 40 and open and close the intake inlet 10 or the exhaust outlet 11 are arranged at respective ends of the intake valve 14 and the exhaust valve 15. That is, timing at which the intake valve 14 and the exhaust valve 15 are opened and closed in the engine 1 and can be freely set by the valve event control unit 40. In the cylinder head 2, a fuel injection system 18 that injects fuel into the combustion chamber 9 according to an instruction signal from an FI control unit 41 is arranged, and fuel injection quantity and timing can be freely set by the FI control unit 41.

In the engine 1, to detect a condition of the engine 1, an intake air temperature sensor 30 that senses intake air temperature, an exhaust gas temperature sensor 31 that senses exhaust gas temperature, an absolute pressure sensor 32 that senses pressure in the combustion chamber 9 (in the cylinder), a crank timing sensor 33 that senses a turning angle of the crankshaft 8 and a throttle angle sensor 34 that senses an angle of a throttle valve 19 are mounted. To determine fuel injection quantity and injection timing, intake air temperature sensed by the intake air temperature sensor 30, a throttle angle sensed by the throttle angle sensor 34 and a turning angle of the crankshaft 8 sensed by the crank timing sensor 33 are input to the FI control unit 41. To determine timing at which the intake valve 14 and the exhaust valve 15 are opened and closed, a turning angle of the crankshaft 8 sensed by the crank timing sensor 33 and air-fuel ratio determined by the FI control unit 41 are input to the valve event control unit 40.

Figure 2:
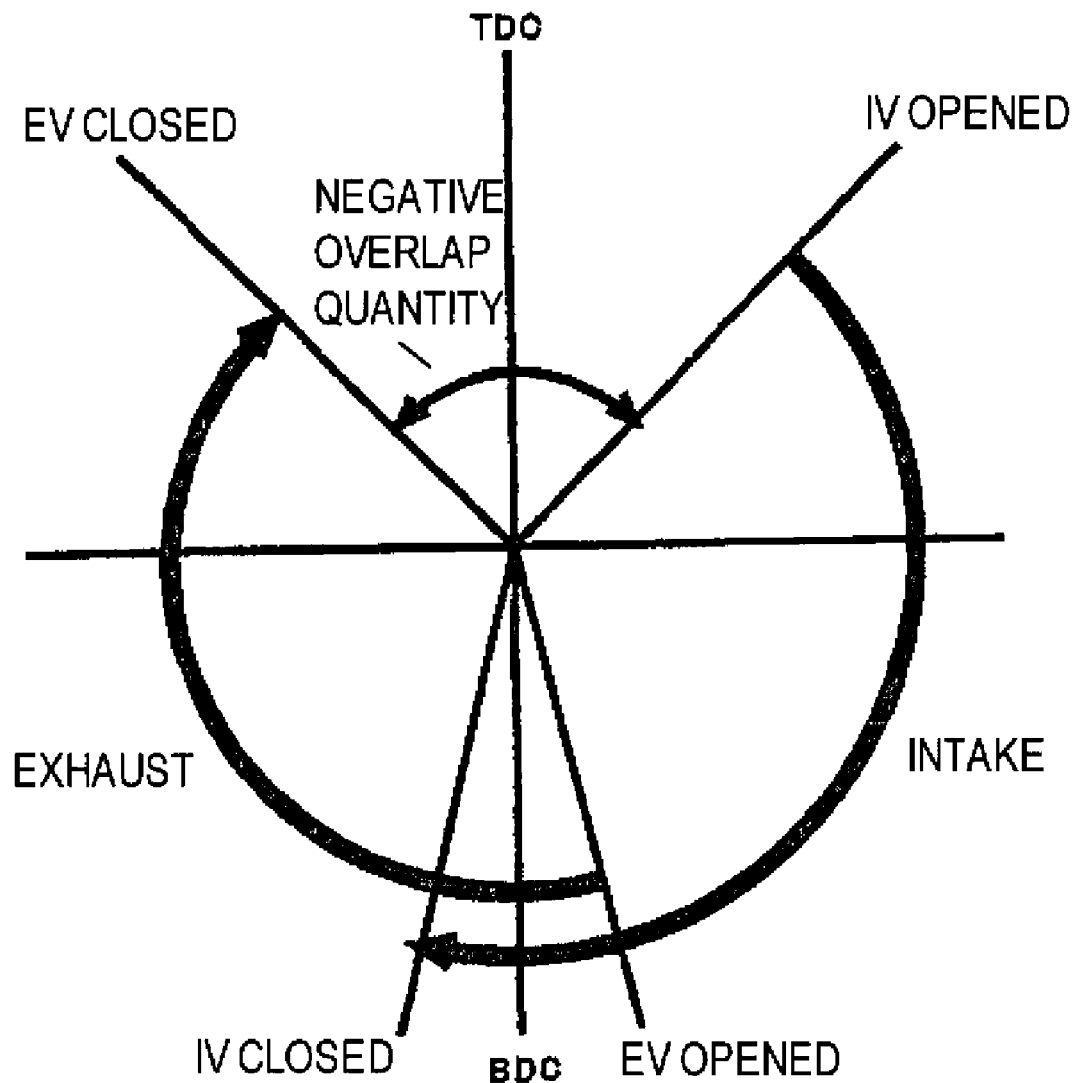
FIG. 2 is a valve timing diagram in compression self ignition operation.

When compression self ignition operation is executed in the engine 1 configured as described above, the intake valve (IV) 14 is opened when the piston 6 passes a compression top dead center (TDC) as shown in FIG. 2. Then, air the inflow of which is regulated by the throttle valve 19 through an intake pipe 20 and the intake port 12 flows into the combustion chamber 9 where burned gas (residual gas) in the preceding cycle remains. When the piston 6 passes a compression bottom dead center (BDC), the intake valve 14 is closed, the air and the residual gas in the combustion chamber 9 are compressed, and fuel is injected into the combustion chamber 9 from the fuel injection system 18 in the vicinity of the compression top dead center. At this time, when in-cylinder gas temperature exceeds 1000 K, the fuel is ignited by itself and is combusted by the heat of the residual gas in the preceding cycle to be the force that pushes down the piston 6, and is transformed into the rotational energy of the crankshaft 8 via the connecting rod 7. Finally, the exhaust valve (EV) 15 is opened before the piston 6 reaches the compression bottom dead center, a part of burned gas is exhausted outside from the exhaust port 13 via an exhaust pipe 21 and a muffler 22, the exhaust valve 15 is closed before the piston 6 reaches the compression top dead center, and one cycle is finished.

In normal spark ignition operation, the intake valve 14 and the exhaust valve 15 are simultaneously opened (valve overlap) in the vicinity of the compression top dead center between an exhaust stroke and an intake stroke, however, as described above, in the compression self ignition operation, to leave residual gas in the combustion chamber 9, both the intake valve 14 and the exhaust valve 15 are closed in the vicinity of the compression top dead center between the exhaust stroke and the intake stroke and an angle of the crankshaft 8 between when the exhaust valve 15 is closed and the intake valve 14 is opened is called negative overlap quantity in the following description.

In the engine 1 in which such compression self ignition operation is enabled, the spark ignition operation and the compression self ignition operation can be switched according to an operational situation. Therefore, though the following ignition plug is not shown in FIG. 1, the ignition plug for igniting fuel in the combustion chamber 9 is provided to the engine 1.

The reason why compression self ignition occurs in the combustion chamber 9 is that in-cylinder gas temperature reaches the chain initiation temperature of high temperature oxidation and according to this combustion method, the exhaust of nitrogen oxides (NOx) is reduced, however, it is thought that this is that time in which the temperature of a working medium exceeds nitrogen oxides generation initiation temperature ($\approx$1800 K) is short. In-cylinder gas temperature after combustion when the in-cylinder gas temperature reaches 1000 K and fuel of specified quantity is completely combusted isometrically is estimated by thermodynamically estimating the rise of temperature by the combustion of the fuel in the combustion chamber 9. First, in the thermodynamic estimate, it is supposed that in-cylinder gas is completely combusted isometrically, heat by combustion is all used for the rise of in-cylinder gas temperature and no thermal dissociation occurs. Besides, it is supposed that in-cylinder gas is ideal gas, mean specific heat in a temperature raising stroke is applied and the temperature of in-cylinder gas is uniform. On such supposition, when the displacement of the engine is V, the compression ratio is $\epsilon$, the charging efficiency is $\eta c$, the air density is p, the EGR rate (a rate at which burned gas after combustion (called EGR) accounts for in-cylinder all gas quantity) is $\xi$, the equivalence ratio (acquired by dividing the mass mixture ratio of fuel and air (fuel-air ratio) by fuel-air ratio (theoretical mixture ratio) when fuel and air are mixed just enough) is $\Phi$, the low combustion heat of fuel is Hu and the theoretical mixture ratio of fuel is $\alpha$, the mass Ga of air is expressed in the following expression (1), the mass Gf of fuel is expressed in the following expression (2), the mass Gu of air-fuel mixture is expressed in the following expression (3), the mass Gr of residual gas is expressed in the following expression (4), and the combustion heat Q of fuel is expressed in the following expression (5).

Mathematical expression 1

$$Ga = V \cdot \eta_c \cdot \rho \quad (1)$$

$$Gf = Ga \cdot \frac{\Phi}{\alpha} \quad (2)$$

$$Gu = Ga + Gf = Ga \cdot \left(1 + \frac{\Phi}{\alpha}\right) \quad (3)$$

$$Gr = Gu \cdot \frac{\xi}{1-\xi} = Ga \cdot \left(1 + \frac{\Phi}{\alpha}\right) \cdot \frac{\xi}{1-\xi} \quad (4)$$

$$Q = Hu \cdot Gf = Hu \cdot Ga \cdot \frac{\Phi}{\alpha} \quad (5)$$

When the results are applied to a first law of thermodynamics, the following expression (6) is acquired and as a result, the rise of temperature after complete combustion since the initiation of self ignition (a deviation between combustion initiation temperature and peak temperature after combustion) $\Delta T$ is expressed in the following expression (7). In the expressions (6) and (7), Cvf denotes the isovolumic specific heat of air-fuel mixture and Cvr denotes the isovolumic specific heat of residual gas.

Mathematical expression 2

$$Q = \Delta T \cdot (Cvf \cdot Gu + Cvr \cdot Gr) \quad (6)$$

$$\Delta T = \frac{Hu \cdot \frac{\Phi}{\alpha}}{Cvf \cdot \left(1 + \frac{\Phi}{\alpha}\right) + Cvr \cdot \left(1 + \frac{\Phi}{\alpha}\right) \cdot \frac{\xi}{1-\xi}} \quad (7)$$

As shown in the expression (6), when in-cylinder gas is completely combusted, temperature which the in-cylinder gas reaches is univocally determined by the heat capacity (the product of the isovolumic specific heat Cvf, Cvr and the mass Gf, Gr of working media) of the working medium to the combustion heat Q of fuel. That is, difference in heat capacity between the same quantity of heat has an effect on burning velocity. As shown in the expression (7), as the rise of temperature from self ignition initiation temperature (hereinafter called a deviation) $\Delta T$ is determined by air-fuel ratio $\Phi/\alpha$ and an EGR rate $\xi$, the deviation $\Delta T$ is determined independent of the displacement of the engine and an operational load if the air-fuel ratio $\Phi/\alpha$ and the EGR rate $\xi$ are known. As equivalence ratio $\Phi$ according to an operational condition is already known in the engine 1 where fuel injection quantity is controlled by the FI control unit 41 as described above, the deviation $\Delta T$ can be calculated if only an EGR rate $\xi$ is sensed. As described above, the deviation $\Delta T$ between self ignition initiation temperature and peak temperature after combustion is a parameter substituted for combustion heat Q and burning velocity itself can be controlled by this parameter. Therefore, if respective adjustment elements are controlled so that the deviation $\Delta T$ is always in a range of suitable values, combustion temperature is kept between stable high temperature oxidation sustaining minimum temperature and nitrogen oxide generation temperature and stable compression self ignition combustion is enabled.

As described above, control elements for realizing compression self ignition combustion are the following two. First, it is control over timing and in-cylinder gas temperature at the compression top dead center is required to exceed 1000 K. Second, it is control over heat release after ignition and the deviation $\Delta T$ is required to be in a predetermined range. When in-cylinder gas temperature at the compression top dead center is lower than 1000 K, no compression self ignition combustion can be caused and in the meantime, when the deviation $\Delta T$ is not in the predetermined range, misfire after ignition or knocking is caused.

Further, as clear from the expression (7) and others, as an EGR rate $\xi$ can be substituted for the deviation $\Delta T$, combustion heat Q is controlled by controlling the EGR rate $\xi$, ideal compression self ignition combustion can be realized, and as a control parameter over the deviation $\Delta T$ can be possibly reduced by the EGR rate $\xi$, control algorithm can be simplified.

Figure 3:
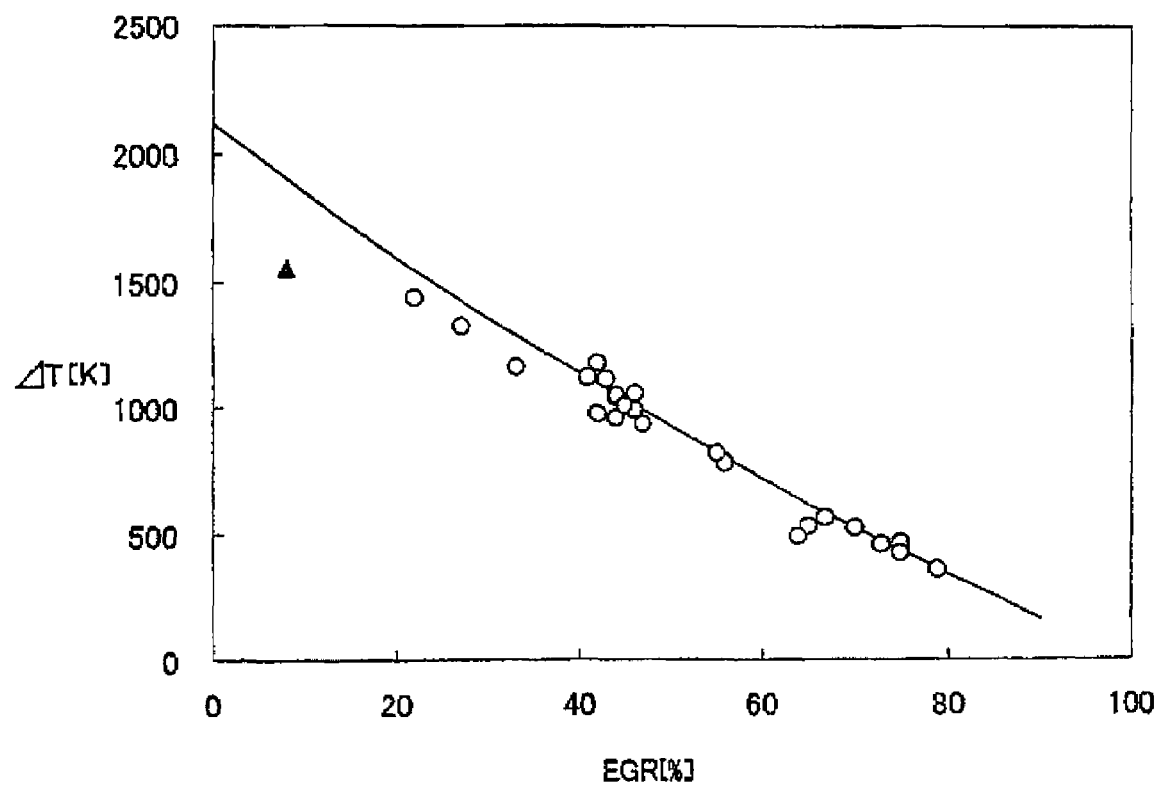
FIG. 3 is a graph showing relation between an EGR rate and a deviation $\Delta T$.

As described above, the deviation $\Delta T$ can be unequivocally determined by the EGR rate independent of an operational load of the engine 1 and velocity. Circles having a void inside shown in FIG. 3 show results acquired by executing compression self ignition combustion in a state in which an operational load and velocity are varied and measuring relation between an EGR rate and a deviation $\Delta T$ at that time (a black triangle shows a result of measuring spark ignition combustion). Besides, in FIG. 3, a full line shows a theoretical calculated value acquired from the expression (7). As described above, the theoretical calculated value acquired from the expression (7) proves substantially equal to a value acquired in an experiment. The reason why the value in the experiment is smaller than the theoretical value in a region in which the EGR rate is smaller (a region in which operation by spark ignition combustion is normally executed) is thought to be due to an effect of thermal dissociation. However, in a range of EGR rates at which compression self ignition combustion occurs, the EGR rates can sufficiently function as a parameter of the deviation $\Delta T$.

Generally, when the EGR rate is in the vicinity of 20%, knocking is caused to be a limit because a nitrogen oxide increases. When the EGR rate is in the vicinity of 80%, misfire is caused to be a limit because hydrocarbon (HC) increases. As clear from FIG. 3, when the EGR rate is 40 to 50%, that is, when control is made so that the deviation $\Delta T$ is approximately 1000 K, ideal compression self ignition combustion is acquired. The experiment example shown in FIG. 3 is merely one example and relation between the EGR rate and the deviation $\Delta T$ varies depending upon the configuration of an engine, the precision of a used sensor, a measured position and others.

EGR includes outside EGR returned to an intake system through an EGR line (not shown in FIG. 1) and inside EGR in which burned gas after combustion in the preceding cycle is left in the cylinder without being exhausted into the exhaust port, however, in this case, a case that a rate of inside EGR (an inside EGR rate) is used for the above-mentioned EGR rate $\xi$ will be described.

To calculate the inside EGR rate, first, the mass Gr of residual gas is calculated according to an enthalpy preservation law of air-fuel mixture and residual gas and an equation of a state when the intake stroke is finished. To calculate the mass Gr of the residual gas, intake air temperature Tu sensed by the intake air temperature sensor 30, exhaust gas temperature Tr sensed by the exhaust gas temperature sensor 31, in-cylinder pressure Pivc sensed by the absolute pressure sensor 32 when the intake valve 14 is closed, the volume Vivc of the combustion chamber 9 at this time, the mass Gu of air-fuel mixture, the mass Ga of air and a constant R of gas are used. When the EGR line is provided in the engine 1, the mass Gegre of outside EGR gas is further used.

The mass Gf of air-fuel mixture is an already known value by fuel injection quantity controlled by the FI control unit 41 or a fuel consumption meter and the mass Ga of air can be calculated based upon air-fuel ratio and the mass Gf of fuel. The volume Vivc of the combustion chamber 9 when the intake valve 14 is closed can be calculated based upon the turning angle of the crankshaft 8 sensed by the crank timing sensor 33 and the data of the engine 1 (a bore×a stroke, the length of the connecting rod, compression ratio, offset quantity and others). The mass Gegre of outside EGR gas can be calculated based upon an outside EGR rate EGRe [%] shown in the following expression (8).

Mathematical expression 3

$$EGRe = \frac{Gegre}{Ga + Gegre} \times 100 \qquad (8)$$

An inside EGR rate $y_{egr}$ can be calculated in the following expression (9) based upon mass Ga of fresh air, the mass Gf of air-fuel mixture and the mass Gr of residual gas respectively calculated as described above.

Mathematical expression 4

$$y_{egr} = \frac{Gr}{Ga + Gf + Gr} \qquad (9)$$

As shown in FIG. 1, in this embodiment, an EGR rate arithmetic unit 42 is provided to the engine 1, the EGR rate (the inside EGR rate $y_{egr}$) is calculated based upon values sensed by the intake air temperature sensor 30, the exhaust gas temperature sensor 31, the absolute pressure sensor 32 and the crank timing sensor 33 in the above-mentioned expressions (8), (9), and the EGR rate is used for control over compression self ignition combustion operation, that is, for control over the deviation $\Delta T$.

Figure 4:
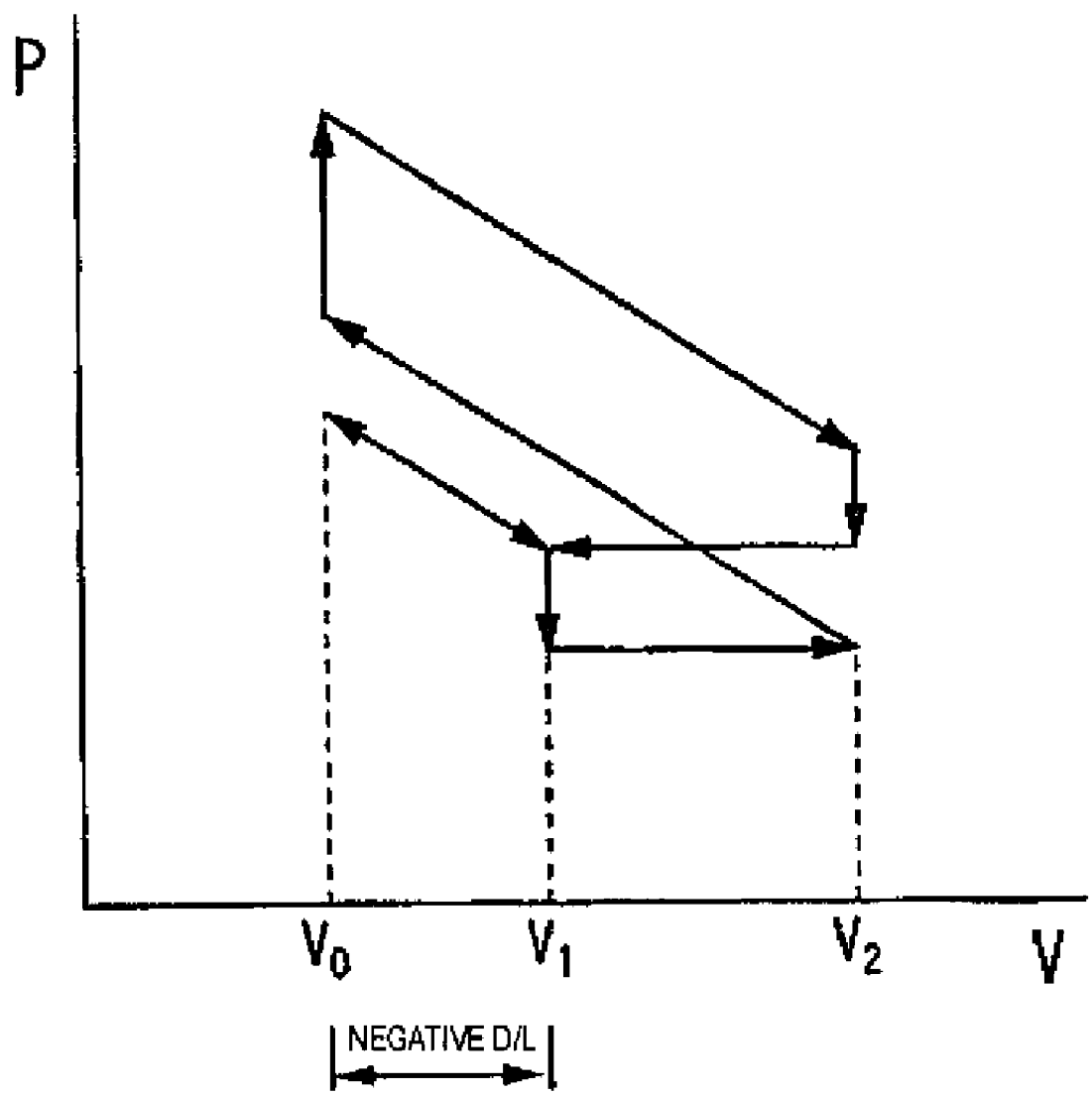
FIG. 4 is a P-V diagram in the compression self ignition operation.

In this embodiment, a case that negative overlap quantity is varied by the valve event control unit 40 and the deviation $\Delta T$ is controlled will be described as feedback control using the EGR rate (the inside EGR rate $y_{egr}$). First, referring to FIGS. 2 and 4, relation between the negative overlap quantity and the EGR rate will be described. In a P-V diagram shown in FIG. 4, $V_0$ denotes the volume of the combustion chamber 9 when the piston 6 is located in the compression top dead center, $V_2$ denotes the volume of the combustion chamber 9 when the piston 6 is located in the compression bottom dead center, and $V_1$ denotes the volume of the combustion chamber 9 when the exhaust valve 15 is closed and the intake valve 14 is opened between the exhaust stroke and the intake stroke (that is, at the time of negative overlap). Therefore, when the negative overlap quantity is increased by the valve event control unit 40, the volume $V_1$ increases and as a result, as the mass Gr of residual gas increases and the mass Gu of air-fuel mixture decreases, the EGR rate increases as clear from the expression (9). In the meantime, when the negative overlap quantity is reduced, the volume $V_1$ decreases and the EGR rate also decreases.

Figure 5:
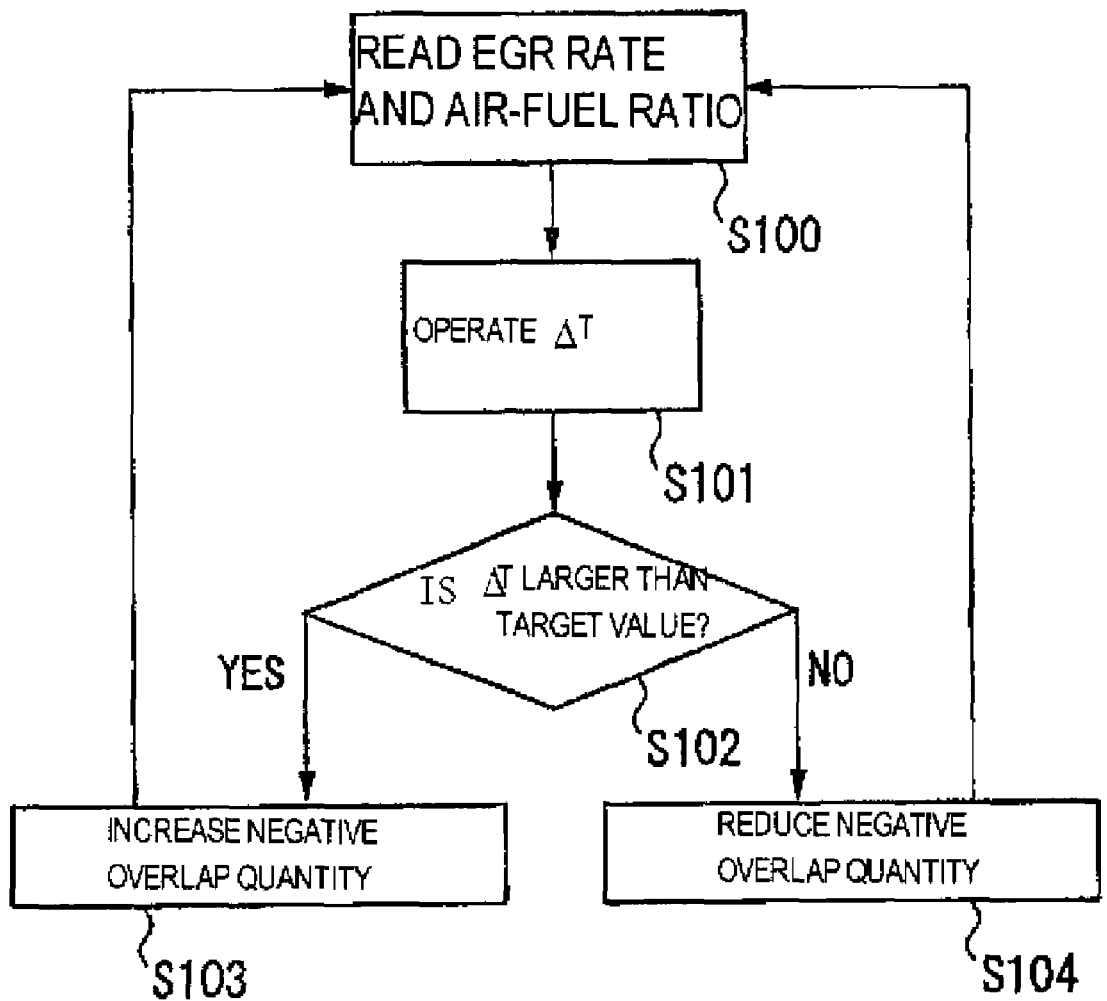
FIG. 5 is a flowchart showing a process for determining negative overlap quantity in a valve event control unit.

As shown in FIG. 1, the EGR rate operated by the EGR rate arithmetic unit 42 is input to the valve event control unit 40. The valve event control unit 40 reads the EGR rate from the EGR rate arithmetic unit 42 every combustion cycle of the engine 1 as shown in FIG. 5, reads air-fuel ratio from the FI control unit 41 (a step S100), and the deviation ΔT is operated based upon these values in the expression (7) (a step S101). It is judged whether the deviation ΔT is larger than a target value (1000 K in the engine shown in FIG. 3) or not (a step S102), when the deviation ΔT is larger than the target value, the negative overlap quantity is increased (a step S103), when the deviation ΔT is smaller than the target value, the negative overlap quantity is reduced (a step S104), and the deviation ΔT is converged on the target value.

As described above, as compression self ignition combustion in the next cycle is stably generated and combustion after ignition can be smoothed when the engine is configured so that the negative overlap quantity for example is varied based upon the EGR rate and the deviation ΔT is converged on a desired value, satisfactory compression self ignition combustion can be made. Besides, control over the compression self ignition combustion engine 1 is greatly simplified by controlling the deviation ΔT by the EGR rate and the security of control over an unexpected event can be greatly enhanced. At this time, as the data of the engine used for calculating the EGR rate are already known values at the time of the design of the engine 1 and injection quantity, air-fuel ratio, intake air temperature, exhaust gas temperature and in-cylinder pressure can be acquired from sensors normally used in the engine 1, no dedicated sensor is required to be provided and the cost of the engine 1 can be reduced.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A control method of a compression self ignition internal combustion engine provided with a fuel injection mechanism that supplies fuel of arbitrary quantity into a combustion chamber and a variable valve mechanism that varies the ratio of burned gas and air-fuel mixture in the combustion chamber for combusting the fuel by compression self ignition, the method comprising the step of:

converging a deviation between combustion initiation temperature and peak temperature after combustion in the combustion chamber in a predetermined range during the self ignition operation, in order to leave residual gas in the combustion chamber, wherein both the intake valve and the exhaust valve are closed in the vicinity of compression top dead center between the exhaust stroke and the intake stroke.

2. The control method according to claim 1, wherein an EGR rate is substituted for the deviation.

3. The control method according to claim 2,
wherein the EGR rate is calculated based upon fuel injection quantity, air-fuel ratio, intake air temperature, exhaust gas temperature, in-cylinder pressure and the data of the engine.

* * * * *